Patented July 31, 1945

2,380,896

UNITED STATES PATENT OFFICE 2,380,896

PROCESS OF PREPARING MIXED POLY-CARBOXYLIC ACID ESTERS OF CELLULOSE

Frank J. Kaszuba, Binghamton, N. Y., assignor to General Aniline & Film Corporation, New York, N. Y., a corporation of Delaware No Drawing. Application July 6, 1944, Serial No. 543,751

14 Claims. (Cl. 260—225)

This invention relates to mixed polycarboxylic acid esters of cellulose and particularly to mixed cellulose esters of tricarboxylic acids and a process of preparing the same.

It is known that cellulose esters of monobasic and dibasic acids, soluble in water basic solutions, aqueous acetone and aqueous alcohol, can be readily prepared by (1) heating either cellulose triacetate or hydrolyzed cellulose acetate with a monobasic or dibasic acid in the presence of a solvent, or (2) by heating an esterifiable cellulose derivative with a substantial amount of dibasic acid in the form of its anhydride or acyl halide in the presence of an organic base such as pyridine, pyridine-benzene mixture, tetrachlorethane-quinoline mixture and tetrachlorethanedimethylaniline mixture, which base or mixture acts as a catalyst for the esterification reaction.

At the present time there is no satisfactory method for preparing mixed cellulose esters of polycarboxylic acids containing from 3 to 6 carboxy groups. An attempt to prepare mixed cellulose esters of such acids by the first of the above methods gave rise to products insoluble in water, acetone-water and caustic alkali (either 0.1N or 3N); and using the quantities and technique of the second of the above methods gave rise to a gel which is insoluble in acetone, water or caustic alkali (either 0.1N or 3N). This lack of solubility is due to the formation of cross-linkages between at least two cellulose acetate chains.

It is an object of the present invention to provide mixed cellulose esters of polycarboxylic acids containing 3 to 6 carboxy groups soluble in basic media, aqueous alcohol and aqueous acetone.

Another object is to provide a new mixed cellulose ester of 1-camphoronic acid.

A further object is to provide an improved process for preparing mixed cellulose esters of polycarboxylic acids containing 3 to 6 carboxy groups which employs a relatively inexpensive solvent-diluent for the co-reactants and which has the peculiar property of preventing the formation of cross-linkages between the cellulose acetate chains.

Other objects and features of the present invention will become more apparent as the description proceeds.

The objects outlined above are accomplished by heating under reflux a hydrolyzed acyl cellulose in about eight to sixteen times its weight of 1,4-dioxane with a polycarboxylic acid containing from 3 to 6 carboxyl groups in the form of its anhydride or acyl halide in the presence of a catalyst. A preferred ratio of 1,4-dioxane is from eleven to sixteen times the quantity of the hydrolyzed acyl cellulose employed. In these ratios and in the presence of a basic catalyst, preferably a heterocyclic nitrogen base, such as pyridine and the alkyl derivatives thereof, e. g., methyl pyridine, dimethyl pyridine, ethyl pyridine, trimethyl pyridine, ethylmethyl pyridine and propyl pyridine or quinoline and derivatives thereof, e. g., benzoquinoline and pyridoquinoline, the reaction proceeds readily without forming a gel, and the resulting product, after being isolated, is readily soluble in basic media, aqueous acetone and aqueous alcohol. The ratio of the basic catalyst to hydrolyzed acyl cellulose may vary from 1 to 8. The preferred ratio, however, is from 3 to 5 parts of catalyst to 1 part of hydrolyzed acyl cellulose. Instead of a basic catalyst, the reaction mixture may be catalyzed by adding a few drops of concentrated sulfuric acid or by passing a small stream of dry gaseous HCl into the reaction mixture.

The most essential feature of my invention resides in the use of 1,4-dioxane as the solvent-diluent for the co-reactants. It has been pointed out above that in resorting to the prior art procedures for the purpose of producing cellulose esters of polycarboxylic acids containing from 3 to 6 carboxyl groups, cross-linking of the cellulose ester molecules occurs with an attendant detrimental effect on the solubility properties of the esters. It has been found, however, that 1,4-dioxane has some peculiar property which operates to preclude such cross-linking when 1,4-dioxane is used in the aforementioned relationship. Experiments conducted with other solvent-diluents have served to show that this property appears to be specific to 1,4-dioxane. Thus, attempts to replace 1,4-dioxane with other solvent-diluents previously used in the preparation of mixed cellulose esters of monobasic and dibasic acids, such as acetone, ethyl acetate, chloroform, hexane, nitromethane, dibutyl ether, diethyl carbitol, isophorone, benzene, dimethyl dioxane and the like, have led to products which do not possess the solubility properties of the products obtained when using 1,4-dioxane.

I have further discovered that the quantity of 1,4-dioxane employed in the process is likewise critical and that products of the desired solubility properties cannot be obtained unless there be utilized for 1 part of the hydrolyzed acyl cellulose about 8 to 16 parts of 1,4-dioxane. The use of an amount of 1,4-dioxane in excess of 16 parts to 1 part of the acyl cellulose retards the rate of the esterification and results in a product having inferior solubility; on the other hand, the use of a quantity of 1,4-dioxane smaller than about 8 parts to 1 part of the acyl cellulose has the disadvantage that it tends to give rise to the formation of cross-linkages between the acyl cellulose chains. Therefore, my objects can only be accomplished by employing 1,4-dioxane as the solvent-diluent and by using a ratio of about 8 to 16 parts of 1,4-dioxane to 1 part of the acyl cellulose to be esterified.

In practicing the present invention, any suitable hydrolyzed acyl cellulose may be employed as the starting material, such as, for example, formic, acetic, propionic and butyric esters, and mixed esters thereof, obtained by limited acylation of cellulose, or by partial hydrolysis of the corresponding triacyl cellulose.

The polycarboxylic acids preferred in accordance with the present invention are, aconitic acid, tricarballylic acid, 1-camphoronic acid, isocamphoronic acid, β-carboxymethyl-β-methyl-glutaric acid, 1,2,4-butanetricarboxylic acid, trimesic acid and methyltricyclobutanetricarboxylic acid in the form of their anhydrides or acid chlorides. Other polycarboxylic acids having from four to six carboxyl groups, such as prehnitic acid, mellophanic acid, ethanetetracarboxylic acid, ethylenetetracarboxylic acid, pentanepentacarboxylic acid and mellitic acid may also be employed in the form of their anhydride or acid chloride.

For a fuller understanding of the nature and objects of the invention, reference is made to the following examples which are given merely to further illustrate the invention, and they should not be regarded as limiting the invention.

Example I 1 gram of cellulose acetate (containing 44% acetic acid) was dissolved in 4 grams of pyridine and the solution then diluted by the addition of 16 grams of 1,4-dioxane. 2 grams of tricarballylic acid anhydride was then added and the mixture heated under reflux on the steam bath for about one hour. The reaction mixture was then poured with stirring into cold dilute hydrochloric acid containing 5 ml. of concentrated hydrochloric acid in 12.5 ml. of water. The precipitated ester was then washed thoroughly with ice water and dried. The product is soluble in 0.1N-sodium hydroxide solution, aqueous acetone and basic media.

A similar product was obtained as in the above example when pyridine was replaced by quinoline.

Example II 1 gram of cellulose acetate (containing 44% acetic acid) was dissolved in 16 grams of 1,4-dioxane to which solution was added 2 grams of tricarballylic anyhdride and a few drops of concentrated sulphuric acid. The reaction mixture was then heated under reflux for three hours on a steam bath, after which it was chilled and poured into ice water. The precipitate which formed was centrifuged, washed with ice water, and dried. The product is soluble in aqueous alcohol, in aqueous acetone, 0.1N-sodium hydroxide solution and basic media.

Example III 1 gram of cellulose acetate (containing 44% acetic acid) was dissolved in 4 grams of quinoline and the solution diluted by the addition of 16 grams of 1,4-dioxane. 2 grams of 1-camphoronic acid anhydride was then added and the mixture heated under reflux on the steam bath for about one hour. The reaction mixture was then poured into a cold dilute hydrochloric acid solution containing 5 ml. conc. HCl and 12.5 ml. of water. The precipitated ester was then washed thoroughly with ice water and dried. The product is soluble in 0.1N-sodium hydroxide, aqueous acetone, aqueous alcohol and basic media.

Example IV

Example III was repeated by substituting aconitic acid for 1-camphoronic acid using the same diluent and catalyst. The product obtained after preciptating, washing and drying is soluble in 0.1N-sodium hydroxide, aqueous alcohol, aqueour acetone and basic media.

Example V

The cellulose acetate tricarballylate prepared according to Example I was dissolved in aqueous acetone. A 5% solution of sodium hydroxide was added slowly with continuous stirring until the solution of the mixed ester was slightly alkaline to phenolphthalein. The slightly alkaline solution was evaporated to dryness. The product is soluble in water and may be coated out from its aqueous solution to form sheets or skins.

The products obtained in carrying out the present invention may be employed in the form of their alkali salts with various bases in coating photographic films to provide anti-static and anti-halation layers. They may also be employed as modifiers for coupling components in color photography. Coupling components which ordinarily have a tendency to wander or diffuse from the emulsions in which they are incorporated exhibit much less tendency to wander and diffuse when incorporated in the emulsions with a small quantity of water soluble salt of the mixed ester. Aqueous alcohol or aqueous acetone solutions of the mixed esters are also useful as adhesive compositions and sizing materials. In particular, they are especially useful as carriers and binding agents for the dyes employed in preparing dye coating compositions for coloring black and white or monochrome negatives, which colored negatives are then used in making colored photographic prints.

The term "basic media" as employed herein and in the appended claims is not limited to solutions of 0.1N-sodium hydroxide, but is intended to embrace aqueous solutions of other alkaline substances, such as potassium hydroxide, ammonium hydroxide, sodium carbonate, alkali phosphates, pyridine, quinoline, morpholine, alkyl amines such as methyl amine, ethyl amine, triethyl amine, etc., in which solutions the products obtained according to the present invention are soluble.

While the present invention has been described in considerable detail with reference to certain preferred procedures, materials and uses, it is understood that the invention is not limited thereto and that numerous variations may be made in the procedures herein described, that equivalent materials may be substituted, and that many uses other than those mentioned are contemplated. All such modifications and variations are within the scope of the invention as defined by the appended claims.

I claim:

1. A 1-camphoronic acid ester of cellulose acetate.
2. A 1-camphoronic acid ester of cellulose acetate which is soluble in basic media, aqueous alcohol and in aqueous acetone.

3. The process of preparing acyl cellulose polycarboxylates which comprises esterifying a partially acylated cellulose with a polycarboxylic acid compound selected from the class consisting of polycarboxylic acid anhydrides and polycarboxylic acid chlorides containing from three to six carboxyl groups in the presence of about eight to sixteen parts by weight of 1,4-dioxane to one part by weight of said acyl cellulose.

4. The process as defined in claim 3 wherein the esterification is effected by means of a heterocyclic nitrogenous base as a catalyst.

5. The process as defined in claim 3 wherein the esterification is effected by means a mineral acid as a catalyst.

6. The process of preparing acyl cellulose polycarboxylates which comprises esterifying a hydrolyzed acyl cellulose in eight to sixteen parts by weight of 1,4-dioxane with a polycarboxylic acid compound containing from three to six carboxyl groups and selected from the class consisting of such polycarboxylic acid anhydrides and said chlorides in the presence of a pyridine as the catalyst.

7. The process as defined in claim 6 wherein the amount of the catalyst employed is from three to five parts by weight.

8. The process of preparing acyl cellulose polycarboxylates which comprises esterifying a hydrolyzed acyl cellulose in eight to sixteen parts by weight of 1,4-dioxane with a polycarboxylic acid compound containing from three to six carboxyl groups selected from the class consisting of such polycarboxylic acid anhydrides and acid chlorides in the presence of a quinoline as the catalyst.

9. The process as defined in claim 8 wherein the amount of the catalyst employed is from three to five parts by weight.

10. The process of preparing cellulose acetate tricarballylate which comprises esterifying a hydrolyzed cellulose acetate in sixteen parts by weight of 1,4-dioxane with the anhydride of tricarballylic acid in the presence of pyridine.

11. The process of preparing cellulose acetate l-camphoronate which comprises esterifying a hydrolyzed cellulose acetate in sixteen parts by weight of 1,4-dioxane with the anhydride of l-camphoronic acid in the presence of quinoline.

12. The process of preparing cellulose acetate aconitate which comprises esterifying a hydrolyzed cellulose acetate in sixteen parts by weight of 1,4-dioxane with the anhydride of aconitic acid in the presence of quinoline.

13. The process of preparing mixed esters of cellulose acetate tricarboxylates which comprises heating under reflux conditions a one part by weight of a partially acylated cellulose in sixteen parts by weight of 1,4-dioxane with a tricarboxylic acid anhydride in the presence of three to five parts by weight of a quinoline as the catalyst.

14. The process of preparing mixed esters of cellulose acetate tricarboxylates which comprises heating under reflux conditions one part by weight of a partially acylated cellulose in sixteen parts by weight of 1,4-dioxane with a tricarboxylic acid anhydride in the presence of a mineral acid as the catalyst.

FRANK J. KASZUBA.